Dec. 26, 1950  A. J. LOEPSINGER  2,535,305
SPRING SUPPORT
Filed Sept. 2, 1949  3 Sheets-Sheet 1

INVENTOR.
Albert J. Loepsinger
BY
Harry Dexterfield
ATTORNEY

Dec. 26, 1950  A. J. LOEPSINGER  2,535,305
SPRING SUPPORT

Filed Sept. 2, 1949  3 Sheets-Sheet 2

INVENTOR.
Albert J. Loepsinger
BY
Harry Dexter Peck
ATTORNEY

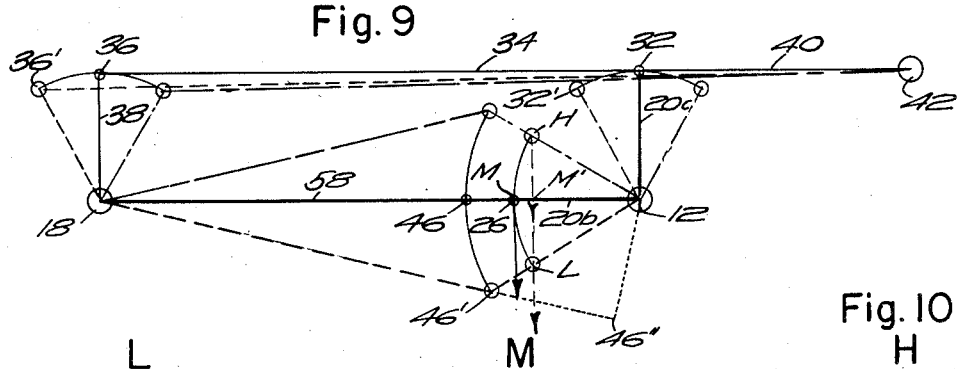
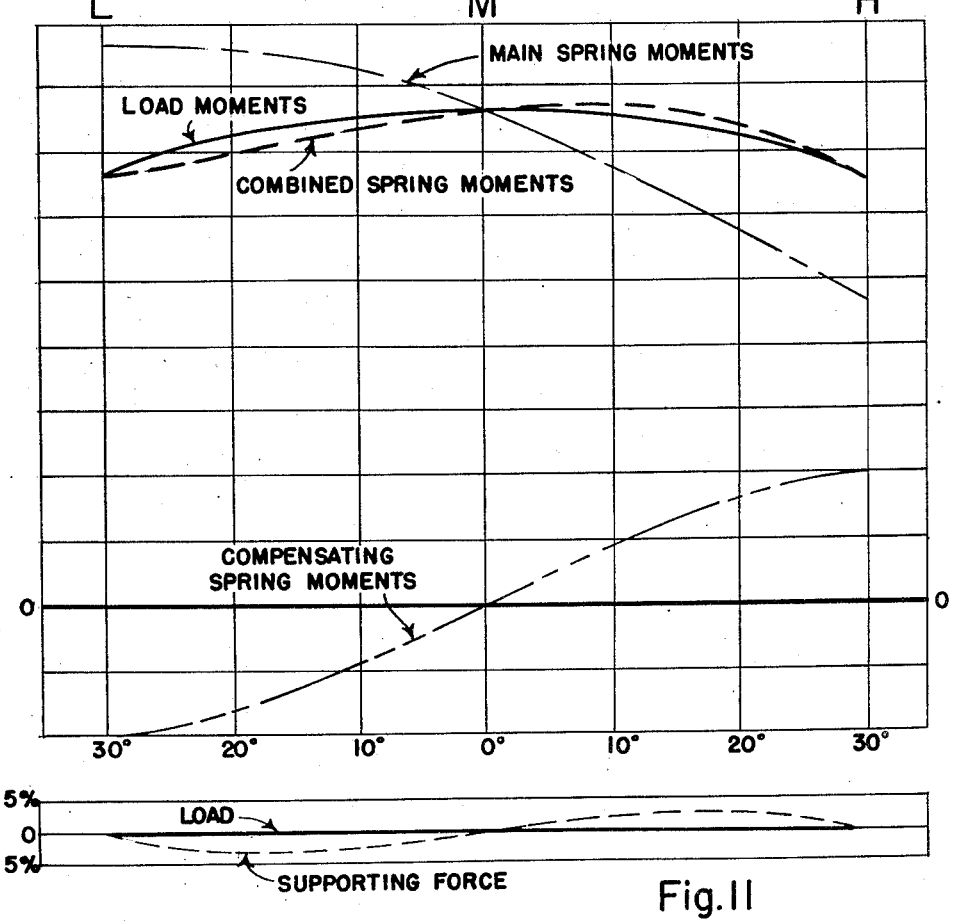

Patented Dec. 26, 1950

2,535,305

UNITED STATES PATENT OFFICE 2,535,305

SPRING SUPPORT

Albert J. Loepsinger, Providence, R. I., assignor to Grinnell Corporation, Providence, R. I., a corporation of Delaware Application September 2, 1949, Serial No. 113,817

5 Claims. (Cl. 248—54)

This invention relates to improvements in spring supports. More especially it has to do with a spring support which, within the limits of its range, permits a known load to move without being subjected to any substantial change in the lifting effect afforded by the support.

The improved support is generally of the same type and for the same purpose as those disclosed in my Letters Patent No. 2,391,467, granted December 25, 1945, and in my copending application Serial No. 744,852 filed April 30, 1947, now Patent No. 2,480,864. In the hanger of my said patent the load is directly carried by main spring means the supporting effect of which varies in accordance with its deflection and this variation is compensated for by a component of a force exerted by compensating spring means. In the support disclosed in my said copending application, a bell crank lever is interposed between the main spring means and the load but nevertheless the supporting effect varies in accordance with the deflection of the spring and this variation is compensated for by compensating spring means also acting on the lever.

The hanger of my patent is supported centrally of itself and the load is centrally supported from it. This is a desirable arrangement in that the hanger as a whole is rather nicely balanced and the horizontal extent of the hanger is evenly distributed on both sides of the vertical axis of the support. However, since the main spring means is also disposed vertically and acts directly upon the load, the length of spring required is so great that the over-all vertical extent of the hanger prohibits its use in places where the head room between the load and the fixed overhead structure is limited. With the support shown in my said copending application, where both the main spring means and the compensating spring means are arranged horizontally, the vertical extent of the hanger is greatly reduced over that of the hanger of my said patent and requires very much less headroom for its installation. On the other hand, in the hanger of my said application the lever is at one end of the frame and the tie rod from the fixed overhead structure to the support and the tie rod from the lever to the load are also close by the same end of the frame. This causes the hanger itself to be greatly unbalanced about its own supporting tie rod and results in the greater part of the hanger projecting out on one side of the two tie rods.

Illustrative of a known load with which the improved support is usable is a piping system for conducting a fluid subject to wide variations in temperature. When the temperature rises the pipes in the system elongate several inches, and this change in length of the vertically disposed portions of the piping system causes the horizontal portions to move upward or downward as well. The upper limit of the displacement is commonly called the "hot" position and the lower limit the "cold" position of the system. These positions may of course be reversed if the piping moves downward as its temperature increases.

Except for relatively inconsequential changes the weight of the piping system remains substantially constant. It is therefore important that the lifting effect of the supporting means likewise remain substantially constant regardless of the movement of the piping, because if the load is not properly supported at all times its movement may impose unsafe stresses and reactive forces upon the piping itself or the fittings or apparatus to which it is connected, or upon both. The principal object of the present invention is to provide a spring support which will embody the desirable features of both the hanger of my Patent No. 2,391,467 and that of my copending application Serial No. 744,852. That is to say, it is an object of this invention to provide a support which will be substantially balanced and evenly distributed with respect to the tie rod by which it is hung from an overhead fixed structure, and to provide a leverage system which permits the main and compensating spring means to be arranged horizontally (thus saving headroom) with the load supported at substantially the center of the hanger.

The best mode in which it has been contemplated to apply the principles of my present improvements is shown in the accompanying drawings but these are to be deemed merely illustrative because it is intended that the patent shall cover by suitable expression in the appended claims whatever features of patentable novelty exist in the invention disclosed.

In the drawings:

Fig. 9 is a diagrammatic representation of the movable parts of the hanger;

Fig. 10 is a chart showing the characteristic moment curves of the hanger; and

Fig. 11 is another chart showing the percentage variation of the supporting force from a constant load.

Figure 1:
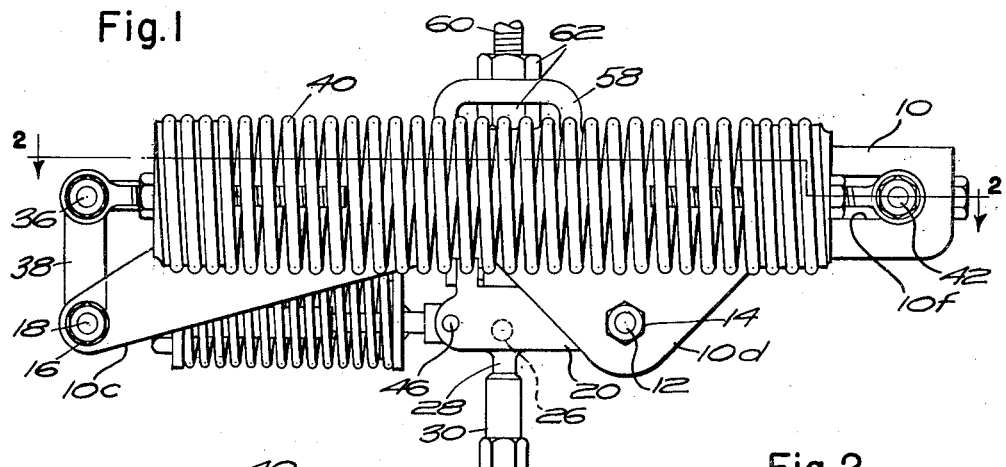
Fig. 1 is a side elevation of a spring support embodying my present improvements and showing the position of the parts when the load is being supported entirely by the main spring means and is at what is preferably the mid-position of its range of vertical travel.
Figure 2:
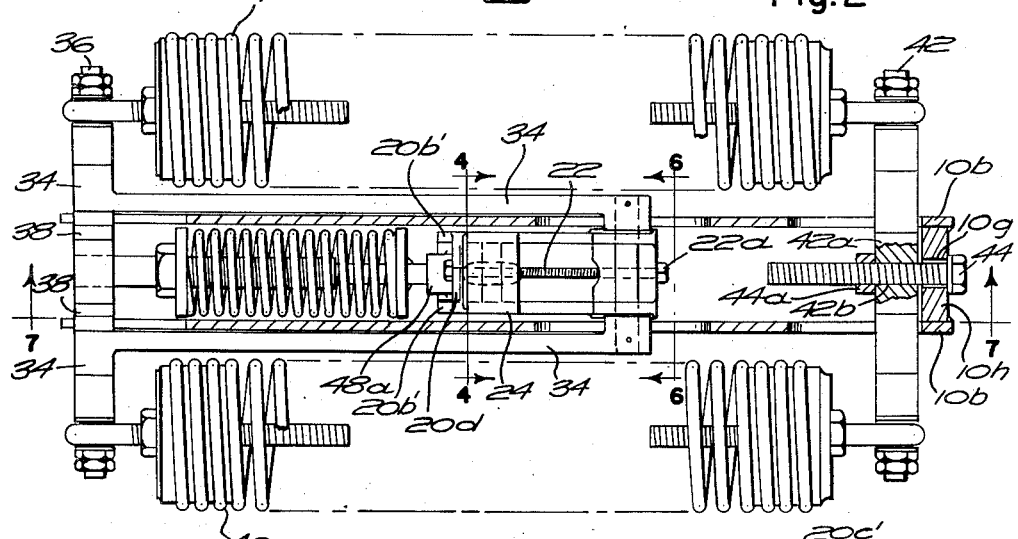
Fig. 2 is a plan view of the hanger with parts in section as on line 2—2 of Fig. 1.
Figure 3:
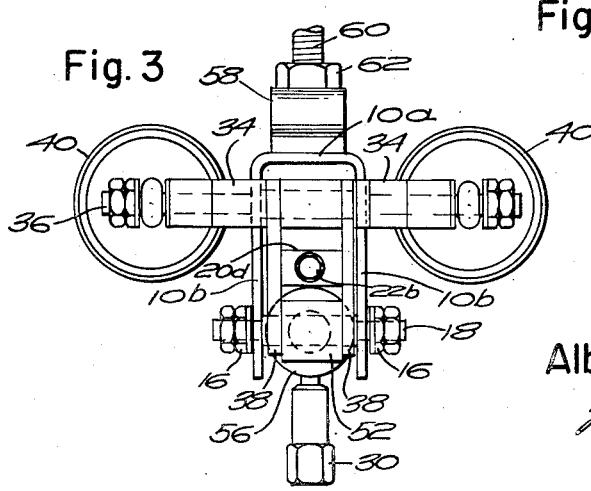
Fig. 3 is an end view looking from the left in Fig. 1.
Figure 4:
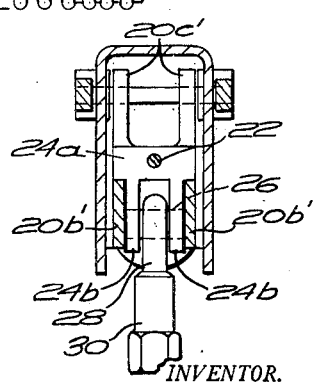
Fig. 4 is an elevation in section taken as on line 4—4 of Fig. 2.
Figure 5:
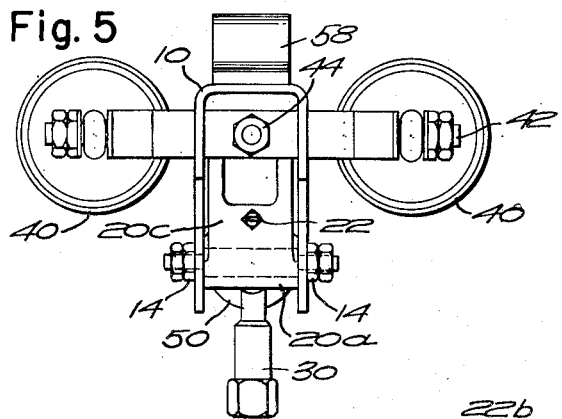
Fig. 5 is an end view looking from the right in Fig. 1.
Figure 6:
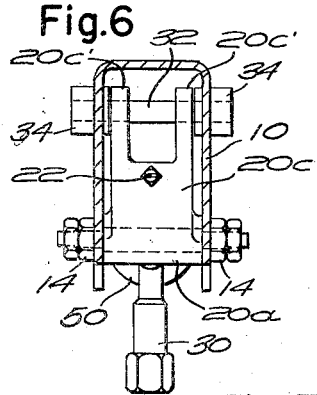
Fig. 6 is an elevation in section taken as on line 6—6 of Fig. 2.
Figure 7:
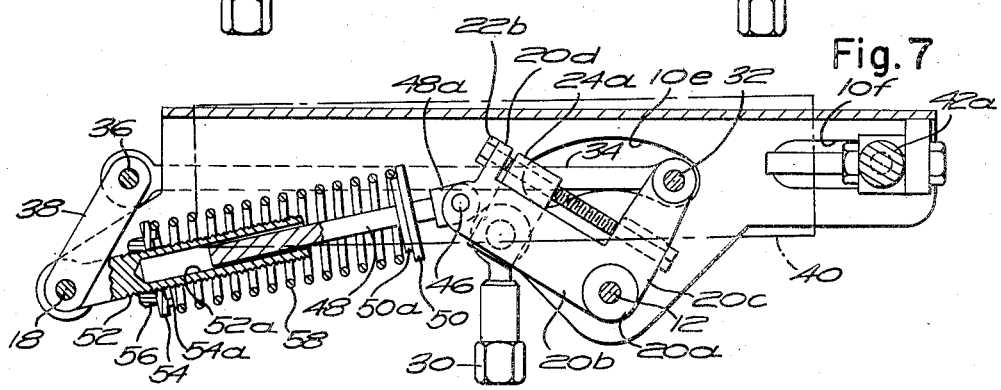
Fig. 7 is a vertical section taken as on line 7—7 of Fig. 2, but showing the relative positions of the movable parts when the load is at a high position in its range of travel, the main spring means being indicated by dot-and-dash outlines.
Figure 8:
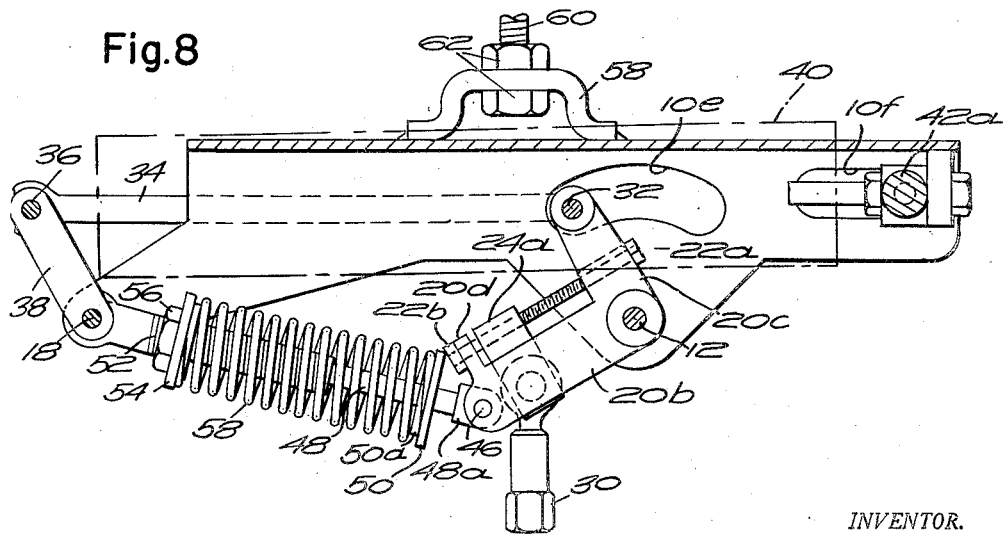
Fig. 8 is another vertical section similar to Fig. 7 and taken as on line 7—7 of Fig. 2 but showing the relative positions of the movable parts when the load is at a low position in its range of travel.

Referring now more particularly to the drawings the support shown as a preferred embodiment of the present invention has a frame 10 which is a U-shaped plate with a flat top 10a and depending sides 10b. The latter have corresponding portions 10c at one end projecting beyond the top plate and near the middle of the frame are other portions 10d between which is journaled what I shall term the main axle 12 of the hanger. This axle extends through the side plate portions and is provided with suitable shoulders and threaded ends for nuts 14 to clamp the side plates and axle firmly together. The other projecting portions 10c of the side plates are similarly clamped by nuts 16 to what, for purposes of distinction, I will term an auxiliary axle 18.

Rotatably mounted on the main axle 12 is the main lever 20 of the hanger. This is preferably a bell crank having a hub 20a with bifurcated arms 20b and 20c disposed at right angles to one another. The horizontally extending arm 20b has its branches 20b' connected near their ends by an upstanding cross piece 20d having a central hole through which the shank of a bolt 22 extends to and through an aligned hole in the hub 20a of the lever. This bolt is freely rotatable in these unthreaded holes and hence does not move along its own axis, the head 22a of the bolt turning on a flat face of the lever 20 and a nut 22b pinned to the end of the bolt turning on the side face of the cross piece 20d. The threads of the bolt engage threads in the cross-head 24a of a T-shaped block 24 which is connected with the load. The cross-head spans and rests on the branches 20b' of the lever arm 20b and from this cross-head depending legs 24b extend downward between the branches 20b' and provide journals for a short axle 26 which passes through the eye of a tie bolt 28. A sleeve nut 30 is screwed on the tie bolt and to it may be screwed the end of another tie rod (not shown) which is connected with the load to be supported. By turning the bolt 22 in one direction or the other the block 24 and tie rod 28 can be moved toward or away from the main axle 12 of the hanger and thus vary the moment arm of the load and the vertical extent of its travel for the same angular displacement of the main lever.

The branches 20c' of the upstanding arm 20c of the main lever carry an axle pin 32 which projects through arcuate slots 10e in both side plates of the frame and at both ends this axle pin is connected by duplicate links 34 with another axle pin 36 carried by a pair of cranks 38 journaled on the auxiliary axle 18. Obviously whatever angular movements of the main lever 20 occur the same movements are transmitted to the cranks 38 by the links 34.

Rotatably secured to the ends of the axle pin 36 are two springs 40 which constitute the main spring means of the hanger. These springs extend horizontally on opposite sides of the frame to another axle pin 42 which projects through opposed slots 10f in the side plates of the frame and at its center has a block portion 42a with a threaded hole 42b. The threads of this hole are engaged by threads on the shank of a bolt 44 which extends through an unthreaded hole 10g in a vertically disposed cross plate 10h secured, as by welding, to the top plate 10a and side plates 10b of the frame. This bolt 44 can be freely turned in the hole 10g to cause the axle pin 42 to move along the axis of the bolt. This arrangement permits adjustment of the main spring means to enable its supporting effect to be equal to that of the load when the load arm of the main lever is standing in a horizontal position. A lock nut 44a on the bolt 44 can be tightened against the block portion 42a of the axle pin to maintain this adjustment once it has been made.

The branches 20b' of the load arm 20b of the lever extend somewhat beyond the cross piece 20d thereon, to provide journals for an axle pin 46 for the head 48a of a cylindrical rod 48 on which a plate 50 is secured as by welding. The rod 48 extends beyond the plate and within the hollow or bore 52a of another rod 52 rotatably mounted on the auxiliary axle 18. The outer surface of this tubular rod 52 is threaded and its threads are engaged by the threads in another plate 54 and a locking nut 56. Both plates have opposed flanges 50a and 54a or circular ridges which serve to retain in place a compression spring 58. This is the compensating spring means and its force is exerted on the auxiliary axle pin 18 and on the end of the load lever 20. Its force can be adjusted by moving the threaded plate 54 along the tubular rod 52, the plate being then locked in position by the nut 56.

At the middle of the hanger a bracket 58 is secured to the top plate 10a of the frame and to it is secured a tie rod 60 by means of nuts 62. This tie rod may be connected to some overhead fixed structure from which the hanger is hung. It is a feature of the improved hanger herein disclosed that the axis of this tie rod 60 is centrally located between the extreme ends of the hanger frame. This results in the horizontal extent of the hanger being equal on both sides of the supporting tie rod, and enables the hanger to be installed in locations where the available horizontal space for such a hanger is too small to permit the use of a hanger such as is disclosed in my copending application Serial No. 744,852. Moreover the supporting of the improved hanger at its center gives it a much desired balanced appearance and, as a matter of fact, the weight of the hanger is substantially divided on both sides of the vertical axis through the supporting tie rod 60. The load also hangs from substantially the middle of the hanger, even though the block 24 and tie rod 28 are capable of some horizontal adjustment along the load arm 20b of the lever.

The action of this improved hanger is precisely the same in principle as that of the hanger shown in my said copending application. Referring to Fig. 9, where the movable parts of the support are shown diagrammatically, the action of the hanger can be readily described. In this Fig. 9 the parts are indicated by full lines when the load is at what may be deemed its mid-position M, by dotted lines when the bell crank lever has rotated counterclockwise 30° and the load is at a low position L, and by dot-and-dash lines when the load is at a high position H, with the bell crank lever rotated clockwise 30° from the so-called mid-position. When the arm 20b of the bell crank is horizontal, the moment of the load is the weight times the distance or moment arm M—12. At this position of the lever the load moment is balanced by the moment of the main spring means 40. Although the auxiliary spring means 58 is exerting a force, it is applied along the line 18—12 passing through the main axle 12 and consequently since this force has a moment arm of zero its moment in this position is also zero.

The main spring means is pivotally anchored to the hanger frame at the axle pin 42 and at its other end is connected with the cranks 38. The spring force is acting along the line 36—42 which is perpendicular to the longitudinal axis of the cranks or to the line 36—18. Since the cranks turn about the axle pin 18, the distance 36—18 is the moment arm of the main spring force. To counterbalance the load moment the extension of the main spring means is adjusted so that the force exerted thereby times the moment arm 36—18 will equal the weight of the load times the moment arm M—12. The turning force exerted on the cranks 38 by the main spring means is transmitted unchanged to the vertical arm 20c of the bell crank lever by the links 34 and since the effective length of the cranks and the arm 20c of the lever are the same (in other words the moment arm 36—18 is equal to the moment arm 32—12) the moment exerted on the bell crank by the main spring means is equal to the load moment, but opposite in direction tending to effect rotation.

If it be assumed that the load moves downward from the position M to the position L, the parts will reach the positions indicated for the most part by dotted lines. The moment arm of the load will now be the distance M'—12, and since this is a shorter distance than the moment arm M—12 at the position M, the moment of the load will be less. In Fig. 10, where the various moment curves are shown, the load moments are represented by the solid curved line so marked. Note that as the bell crank lever turns counterclockwise (through the angle of 30° chosen for illustration) from the position M to the position L, the load moment decreases because the moment arm of the load decreases.

This counterclockwise rotation of the bell crank brings its vertical arm 20c to the position indicated by the dotted line 32'—12, and because of the links 34 (not shown in dotted or in dot-and-dash outline for purpose of clarity) the cranks 38 assume the position represented by the dotted line 36'—18. During this rotative movement of the cranks 38 the main spring means is elongated and exerts an increasingly greater force. At the same time the moment arm of the main spring force decreases and when the cranks reach the position 30'—18, this moment arm is the perpendicular distance from the axis 18 to the line of action (36'—42) of the main spring force. But the rate at which this moment arm decreases is much less than the rate at which the force exerted by the main spring means increases and so the moment of the main spring becomes greater as is seen by the dot-and-dash curve marked "main spring moments" on the chart of Fig. 10.

Looking at the "Load moments" curve and the "Main spring moments" curve on the chart of Fig. 10, between the vertical line M and the vertical line L, it is obvious that since the former curve shows increasing moments while the latter curve shows decreasing moments the load will be increasingly oversupported by the main spring means as it moves from position M to position L. To compensate for this, the improved hanger has the compensating spring 58 arranged between the axle pin 18 and the pin 46 carried at the end of the horizontal arm 20b of the bell crank lever.

When this lever arm 20b is at the assumed low position indicated by the dotted line 46'—12, the compensating spring force is acting along the line 18—46'—46''. The perpendicular distance between this line 18—46 and the main axis 12 is the distance 12—46''. Since this distance can be readily determined, and since it is the moment arm of the compensating spring means, the latter need only be adjusted to exert a spring force such that its moment will equal the difference between the moment of the main spring means and the moment of the load at the position L. At the bottom of the chart of Fig. 10, the dot-and-dash curve marked "Compensating spring moments" shows that at the intersection of this curve and the vertical line L, the distance below the zero horizontal line marked O—O is the same as the distance between the intersections of the same vertical line L with the "Load moments" curve and with the "Main spring moments" curve.

Since the force of the compensating spring means is acting to cause rotation in the same counterclockwise direction as the load tends to rotate the bell crank, the moment of the compensating spring means is negative in character and must be subtracted from the moment of the main spring means which is acting to cause rotation of the lever in the clockwise direction. The resulting effective moment of the two spring means is the same as the load moment and thus at the position L the load is supported exactly by the supporting effect of the two spring means.

As the load moves upward from position L back to position M, the axis 46 follows the arc drawn between the points 46' and 46 in Fig. 9. During this movement the compensating spring is being further compressed and therefore exerting an increasing force, but the rate at which it becomes greater is less than the rate at which its moment arm decreases and therefore the moment of the compensating spring becomes less and finally reaches zero when the load is at the position M and the moment arm of the compensating spring force is zero. This is shown by "Compensating spring moments" curve of Fig. 10 intersecting the zero horizontal lines when the latter also intersects the vertical line M.

If the moments of the main spring force and those of the compensating spring force are combined (actually the latter moments are subtracted from the former since the tendency to cause rotation is opposite in direction) and plotted, there is produced the curve of Fig. 10 marked "Combined spring moments." In the movement of the load from position L upward to position M, the combined spring moments do not quite equal the corresponding load moments until the position M is reached. However, as shown by the chart of Fig. 11, where the heavy horizontal line represents the constant "Load" and the curved dotted line represents the "Supporting force" provided by the hanger, the variations from absolute constant support is less than three per cent and that is considered well within safe limits so far as possible damage to a piping system or the elements to which it is connected may be concerned.

A similar description could be given for the action of the hanger when the load moves upward from the position M to the position H. During said movement the load moments again decrease as before explained. The main spring moments also decrease as shown by the "Main spring moments" curve of Fig. 10, due to the fact that both the spring force and the moment arm of that force decrease. Accordingly at the position H the load will be greatly undersupported, if the main spring alone were relied upon but, as a matter of fact, the load is being fully supported because at this position H the moment of the compensating spring is acting to cause rotation of the bell crank in the counterclockwise direction. This is shown by the "Corresponding spring moments" curve of Fig. 10, which increases on the positive side of the zero line O—O from the vertical line M to the vertical line H.

When the moments of the main spring means and the compensating spring means are combined (in this portion of the load travel they are added together) they are found to slightly exceed the load moments between the position M and the position H. Thus the dotted "Combined spring moments" curve comes above the "Load moments" curve and, in Fig. 11, the "Supporting force" curve appears above the "Load" curve. But here again the maximum variation is less than three per cent, and therefore it is proper to say that the improved hanger provides substantially constant support for the load throughout its entire range of vertical travel for which the hanger is designed.

I claim:

1. A spring support for a load of known value subject to displacement within a predetermined range, comprising a fixed element; a rotatable element pivotally mounted on said fixed element close by the middle thereof to which rotatable element the load is connected at substantially the middle of the support and on which rotatable element the load exerts a turning moment in one direction; a second rotatable element pivotally mounted on the fixed element near one end thereof; main spring means connected to the opposite end of said fixed element and to said second rotatable element and exerting a turning moment on the latter element in direction opposite to that of the moment exerted by the load on the first said rotatable element; and linkage connecting said rotatable elements for transmitting unchanged to the first said rotatable element the moment exerted by the main spring means; and compensating spring means interposed between the said fixed element and the first said rotatable element for exerting a turning moment thereon which substantially compensates for any variation between the main spring moment and the load moment.

2. A spring support for a load of known value subject to displacement within a predetermined range, comprising a horizontally extending frame; a bell crank lever pivotally mounted on said frame having an arm extending generally in a horizontal direction and another arm extending generally in a vertical direction, the said horizontally extending arm being connected with the load so that the latter is suspended at substantially the middle of the frame; a crank pivotally mounted near one end of the frame having its arm disposed in parallel relation to the vertically extending arm of the bell crank; a link connecting the crank arm and the said vertically extending arm; main spring means connected to the crank arm and to the frame near the end thereof opposite the end near where the crank is connected; and compensating spring means interposed between the horizontally extending arm of the lever and the end of the frame whereat the crank is mounted.

3. A spring support for a load of known value subject to displacement within a predetermined range, comprising a horizontally extending frame having connection at the middle thereof with an overhead structure; a lever pivotally mounted on the frame close by the middle thereof having an arm extending from the pivot toward one end of the frame from which arm the load is suspended at substantially the middle of the support said lever having a second arm extending at right angles to the first said arm; a second lever pivotally mounted on said frame near one end thereof; a link connecting said second lever with said second arm of the first said lever; main spring means connected with said second lever and anchored to said frame near the end thereof remote from said second lever; and compensating spring means interposed between the first said arm of the first said lever and the end of the frame whereat the second said lever is mounted.

4. A spring support for a load of known value subject to displacement within a predetermined range, comprising a horizontally extending frame adapted to be connected at substantially its middle with an overhead structure; main spring means connected to the frame near one end thereof and extending to near the opposite end thereof; a lever pivotally mounted near the said opposite end of the frame having connection with said spring; another lever pivotally mounted close by the middle of said frame having one arm to which the first said lever is connected by a horizontally disposed link and having a second arm from which the load is suspended at substantially the middle of the support; and compensating spring means interposed between one of the arms of said other lever and one end of the frame.

5. A spring support for a load of known value subject to displacement within a predetermined range, comprising a fixed element; a rotatable element pivotally mounted on said fixed element close by the middle thereof to which rotatable element the load is connected at substantially the middle of the support and on which rotatable element the load exerts a turning moment in one direction of rotation; a second rotatable element pivotally mounted on the fixed element near one end thereof; spring means pivotally connected to the fixed element near the opposite end thereof and also pivotally connected to the said second rotatable element and exerting a turning moment on said second rotatable element in direction of rotation opposite to that of the moment exerted by said load; and a link connecting the rotatable elements together and transmitting the moment exerted by said spring means to the first said rotatable element to oppose the turning moment exerted by said load.

ALBERT J. LOEPSINGER.

No references cited.